US009380023B2

(12) United States Patent
Mraz et al.

(10) Patent No.: US 9,380,023 B2
(45) Date of Patent: *Jun. 28, 2016

(54) ENTERPRISE CROSS-DOMAIN SOLUTION HAVING CONFIGURABLE DATA FILTERS (71) Applicant: Owl Computing Technologies, Inc., Ridgefield, CT (US)

(72) Inventors: Ronald Mraz, South Salem, NY (US); James Hope, Greenwich, CT (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 255 days.

This patent is subject to a terminal disclaimer.

(21) Appl. No.: 14/018,085

(22) Filed: Sep. 4, 2013

(65) Prior Publication Data
US 2014/0337410 A1 Nov. 13, 2014

Related U.S. Application Data (60) Provisional application No. 61/822,712, filed on May 13, 2013.

(51) Int. Cl.
*G06F 9/00* (2006.01)
*H04L 29/06* (2006.01)
*H04L 29/08* (2006.01)

(52) U.S. Cl.
CPC .............. *H04L 63/02* (2013.01); *H04L 63/20* (2013.01); *H04L 67/06* (2013.01); *H04L 69/14* (2013.01); *H04L 67/28* (2013.01)

(58) Field of Classification Search
None
See application file for complete search history.

(56) References Cited

U.S. PATENT DOCUMENTS

| 7,603,704 | B2 | 10/2009 | Bruening et al. |
| 7,675,867 | B1 * | 3/2010 | Mraz ...................... H04L 63/123 370/254 |
| 7,992,209 | B1 * | 8/2011 | Menoher ............... H04L 63/105 726/16 |

(Continued)

FOREIGN PATENT DOCUMENTS

GB 2371125 A 7/2002

OTHER PUBLICATIONS

Prevelakis and Spinellis, Sandboxing Applications, Proceedings of the FREENIX Track: 2001 USENIX Annual Technical Conference; Boston, Massachusetts, US; Jun. 25-30, 2001.

(Continued)

*Primary Examiner* — Jason K. Gee
*Assistant Examiner* — Olanrewaju Bucknor
(74) *Attorney, Agent, or Firm* — John S. Economou (57) ABSTRACT A cross-domain system for transferring files from a client to a server. A first server in the first network domain receives and stores files from the client via the first network. The received files are processed based on predetermined instructions stored in an associated file. The processed received files are transmitted to a second server via a one-way data link. The second server in the second network domain receives and stores the processed received files. The received files are further processed based on predetermined instructions stored in an associated file. The further processed received files are transmitted to the server via the second network. The two associated files are stored in permanent memory with security policies which prevent the files from disrupting operation of the first and second servers, respectively. The security policies allow the associated files to be overwritten to update the processing performed by the associated server.

18 Claims, 7 Drawing Sheets

(56) References Cited

U.S. PATENT DOCUMENTS

| | | | |
|---|---|---|---|
| 8,068,415 B2 | 11/2011 | Mraz | |
| 8,139,581 B1* | 3/2012 | Mraz | H04L 63/105 370/392 |
| 8,352,450 B1* | 1/2013 | Mraz | G06F 17/30578 707/705 |
| 8,572,675 B2* | 10/2013 | Chazin | H04L 63/105 729/1 |
| 8,769,127 B2* | 7/2014 | Selimis | H04L 67/06 709/223 |
| 8,881,223 B2* | 11/2014 | Hudis | G06F 17/30867 709/225 |
| 9,237,126 B2* | 1/2016 | McEvoy | H04L 63/0209 |
| 2006/0050870 A1* | 3/2006 | Kimmel | H04L 63/0428 380/30 |
| 2008/0259929 A1* | 10/2008 | Mraz | H04L 12/5601 370/395.1 |
| 2008/0313648 A1* | 12/2008 | Wang | G06F 21/53 719/315 |
| 2009/0254572 A1* | 10/2009 | Redlich | G06Q 10/06 |
| 2010/0250497 A1* | 9/2010 | Redlich | F41H 13/00 707/661 |
| 2011/0191836 A1* | 8/2011 | Leitersdorf | G06F 15/173 726/6 |
| 2011/0252116 A1* | 10/2011 | Menoher | H04L 63/105 709/217 |
| 2012/0017079 A1* | 1/2012 | Mraz | H04L 9/3236 713/153 |
| 2012/0185911 A1* | 7/2012 | Polite | G06F 21/6218 726/1 |
| 2014/0372517 A1* | 12/2014 | Zuili | H04N 21/4788 709/203 |

OTHER PUBLICATIONS

Goldberg et al., A Secure Environment for Untrusted Helper Applications—Confining the Wiley Hacker; Proceedings of the Sixth USENIX UNIX Security Symposium, San Jose, California, Jul. 1996.

* cited by examiner

ENTERPRISE CROSS-DOMAIN SOLUTION HAVING CONFIGURABLE DATA FILTERS

CROSS-REFERENCES TO RELATED APPLICATIONS

This application claims the benefit of the filing date of U.S. provisional application Ser. No. 61/822,712, filed on May 13, 2013.

FIELD OF INVENTION

This invention relates generally to a cross-domain solution having user-configurable data filters.

BACKGROUND OF THE INVENTION

A cross-domain solution (CDS) is a system that provides the ability to access or transfer data between two networks having differing security domains. A CDS may be one-way only (from a low to a high domain or from a high to a low domain) or may be two-way. For a one-way CDS, highly engineered solutions, such as the Owl Computing Technologies Dual Diode, (described in U.S. Pat. No. 8,068,415, the disclosure of which is incorporated herein by reference) provide a direct point-to-point optical link between the two networks having differing security domains (with data transfer in either the low-to-high direction or in the low-to-high direction). The unidirectionality of the data transfer is enforced in the circuitry of the network interface cards at both network endpoints and in the cable interconnects. In this way, the hardware provides an added layer of assurance of unidirectional information flow and non-bypassable operation. In contrast to software based one-way data transfer systems, it is easy to prove that data is not bypassing the Dual Diode.

Figure 1:
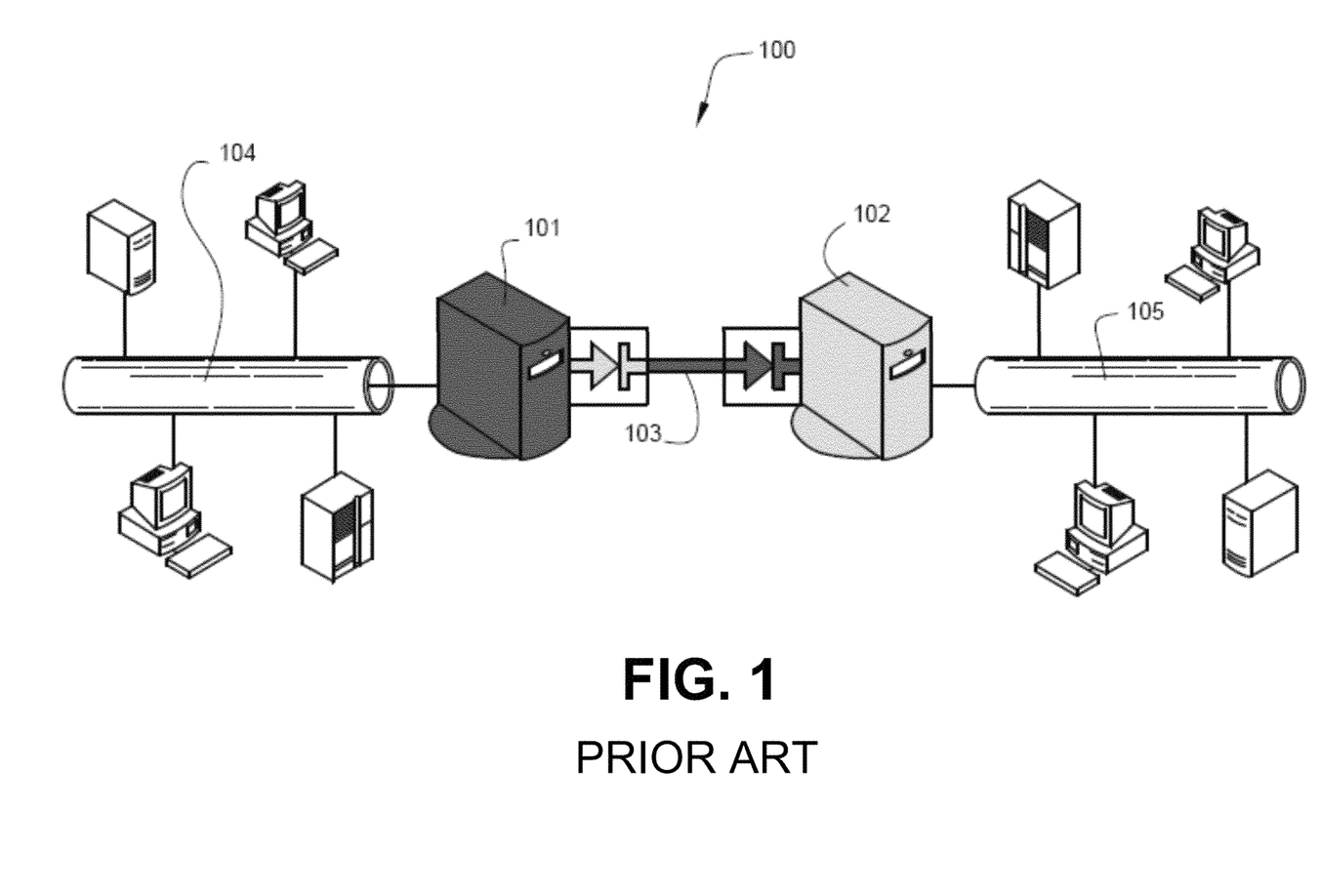
FIG. 1 is a block diagram of a conventional one-way data transfer system.

A one-way CDS system 100 is shown in block diagram form in FIG. 1. A first computing platform (node) 101 ("the Send Node") is connected to a first network 104 in a first security domain ("the source network") and a second computing platform (node) 102 ("the Receive Node") is connected a second network 105 ("the destination network"). The Send Node 101 is connected to the Receive Node 102 by a one-way data link 103, which may be an optical link comprising, for example, a high-bandwidth optical fiber. This one-way optical data link 103 may be configured to operate as a unidirectional data gateway from the source network 104 to the destination network 105 by having its ends connected to an optical transmitter on the Send Node and to an optical receiver on the Receive Node. This configuration physically enforces one-way data transfer at both ends of the optical fiber connecting the Send Node 101 to the Receive Node 102, thereby creating a truly unidirectional one-way data link between the source network 104 and the destination network 105. Unlike the conventional firewalls, one-way data transfer systems based on a one-way data link are designed to transfer data or information only in one direction and it is physically impossible to transfer data or information of any kind in the reverse direction using that link. No information or data of any kind, including handshaking protocols such as those used in data transport protocols such as TCP/IP, SCSI, USB, Serial/Parallel Ports, etc., can travel in the reverse direction from the Receive Node back to the Send Node across the one-way data link. Such physically imposed unidirectionality in data flow cannot be hacked by a programmer, as is often done with firewalls. Accordingly, the one-way data transfer system based on a one-way data link ensures that data residing on the isolated secure computer or network is maximally protected from any undesired and unauthorized disclosure.

CDS systems like the one shown in FIG. 1 may include data filters to filter the data being transmitted across the link 103. Such filters may be included in either the send server 101 or the receive server 102, or in both the send server 101 and the receive server 102. Such filters constitute a software process which performs particular and predetermined processing of the data being transmitted, and may include both generic (e.g., antivirus) and custom (e.g., customer defined) portions. Since a CDS system typically includes a hardened operating system (e.g., based upon SELinux) in each server, the filters in conventional CDS systems are fixed at deployment of such systems and cannot be easily changed thereafter. In addition, a custom data filter may include information which is highly confidential and the customer developing such custom data filter may wish to limit distribution of such filter as much as possible—ideally such filter should be kept within the security domain the filter is designed to protect. This limited distribution is not possible, however, with conventional CDS systems in which all filters are included within the hardened system at deployment.

It is an object of the present invention to provide a configurable filter system for a cross-domain system which overcomes the problems of the prior art.

SUMMARY OF THE INVENTION

The present invention provides a cross-domain solution having servers with a hardened operating system and which includes data filters that may be updated without affecting the constrained file attributes (security policies) afforded to the data filter files.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF THE PREFERRED EMBODIMENTS

In the present disclosure, like reference numbers refer to like elements throughout the drawings, which illustrate various exemplary embodiments of the present invention.

Figure 2:
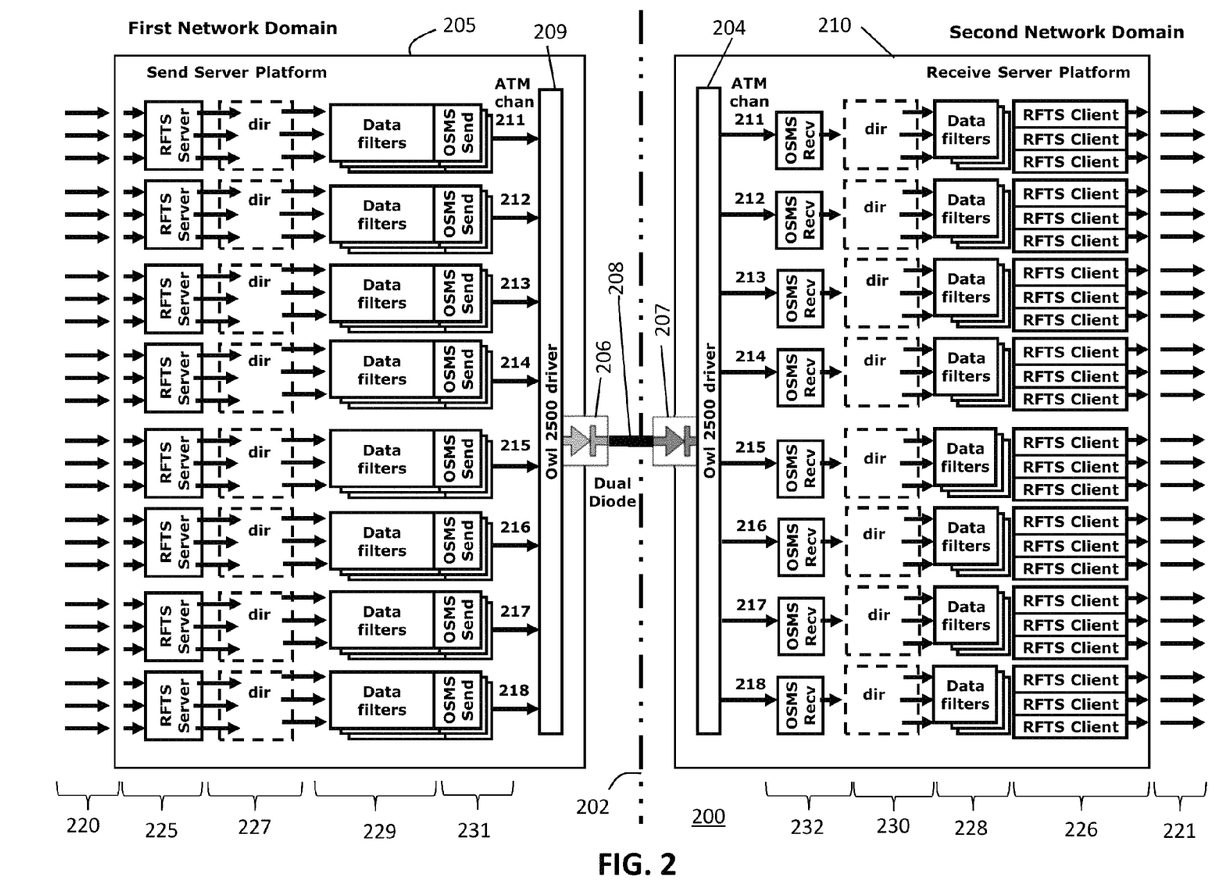
FIG. 2 is a block diagram of a one-way data transfer system incorporating aspects of an embodiment of the invention.

Referring now to the drawings, and in particular to FIG. 2, an enterprise cross-domain system 200 is shown for passing data from clients (not shown) in a first network domain (i.e., the area to the left of the line 202) to associated servers (not shown) in a second network domain (i.e., the area to the right of the line 202). System 200 includes a first server 205 positioned within the first security domain and a second server 210 positioned within the second security domain. System 200 can be configured to pass data from a higher security domain to a lower security domain (i.e., a high to low system) or to pass data from a lower security domain to a higher security domain (i.e., a low to high system). The only difference between the high to low system and the low to high system is the placement of the data filters, and in particular the placement of the customer-supplied custom data filters. System 200 permits a customer to load custom data filters into special placeholders as needed. This gives the customer complete control over which data filters are applied to any given data transfer. This process has a failsafe built into the placeholder filter. If data attempts to pass through a placeholder filter that does not have a legitimate custom data filter installed, an error message is generated, and the file is quarantined. Since customer-supplied custom data filters may include confidential information, such filters are preferably positioned only within the higher security domain. Thus, for a high to low system, all the data filters are preferably included within the sending and thus higher security domain, while a low to high system preferably includes only the customer data filters within the receiving and thus higher security domain. In particular, a high-to-low system will include all data filters, both the generic data filters and the customer-supplied custom filters, within server 205 (shown as filters 229 in FIG. 2). In such a high-to-low system, the data filters 228 in server 210 are preferably omitted. For the low-to-high system, the generic filters are preferably included within first server 205 (as filters 229) and the customer-supplied custom filters are included in second server 210 as filters 228, such that the custom filters are maintained within the higher security domain.

First server 205 is coupled to second server 210 via a one-way link, e.g., a link based on advanced Owl 2500 DualDiode Technology® that provides an absolute channel capacity of 2500 Mbit/sec. Owl DualDiode Technology provides hardware enforcement of an unconditional one-way data flow security policy; it cannot be breached by any form of software attack. When implemented with appropriate software access controls, DualDiode Technology provides robust network separation and data separation within the Cross Domain accreditation boundary.

As shown in FIG. 2, system 200 comprises two separate server platforms, first server 205 and second server 210, separated by a distance, which may range from a few inches to 2 kilometers, connected by an optical fiber 208 carrying data in one direction only. The first server 205, located in the source (first) network domain, operates as a cross-domain sending gateway accessible by data source platforms in the first network domain. The second server 210, located in the destination (second) network domain, operates as a cross-domain receiving gateway that pushes data to destination platforms in the second network domain.

In a presently preferred embodiment, system 200 may comprise the following major components: (1) two Dell R710 server host platforms for first server 205 and second server 210, respectively (alternative x86 or other server platforms of similar characteristics may also be used); (2) a matching pair of Owl DualDiode 2500 Communication Cards (for send card 206 and receive card 207) and associated driver software 209, 204; (3) multiple instances of Owl ScanFile Management System (OSMS) data transfer software (for OSMS send 231 and OSMS receive 232); (4) multiple instances of Owl Remote File Transfer Service (RFTS) data transfer interfacing software (for RFTS servers 225 and RFTS clients 226); (5) multiple instances of File Integrity Orchestration Engine (FIOE) software, which orchestrates invocation of data filter software applications (not shown in FIG. 2 but discussed below); and (6) multiple data filters including, preferably, ClamAV, owlIsAscii, customer-installed custom data filters (shown in FIG. 2 as data filters 228, 229). FIG. 2 also shows the twenty-four data input channels 220, the corresponding data output channels 221 and the temporary storage directories 227 and 230 in each respective server.

As installed, system 200 presents 24 network interfaces 220 at the data inlet designed to carry primary data flow across the CDS accreditation boundary. The twenty-four inlet TCP ports 220 on the send-side network all constitute TCP Server proxies, with fixed port numbers. The IP addresses and server host names are set at time of CDS software installation and thereafter are not user configurable. All data at the CDS outlet 221 is pushed from within the CDS accreditation boundary, and thus no logical interfaces are presented at the CDS outlet and no external available ports or services are presented to the destination network available for access by devices coupled to that network.

Figure 3:
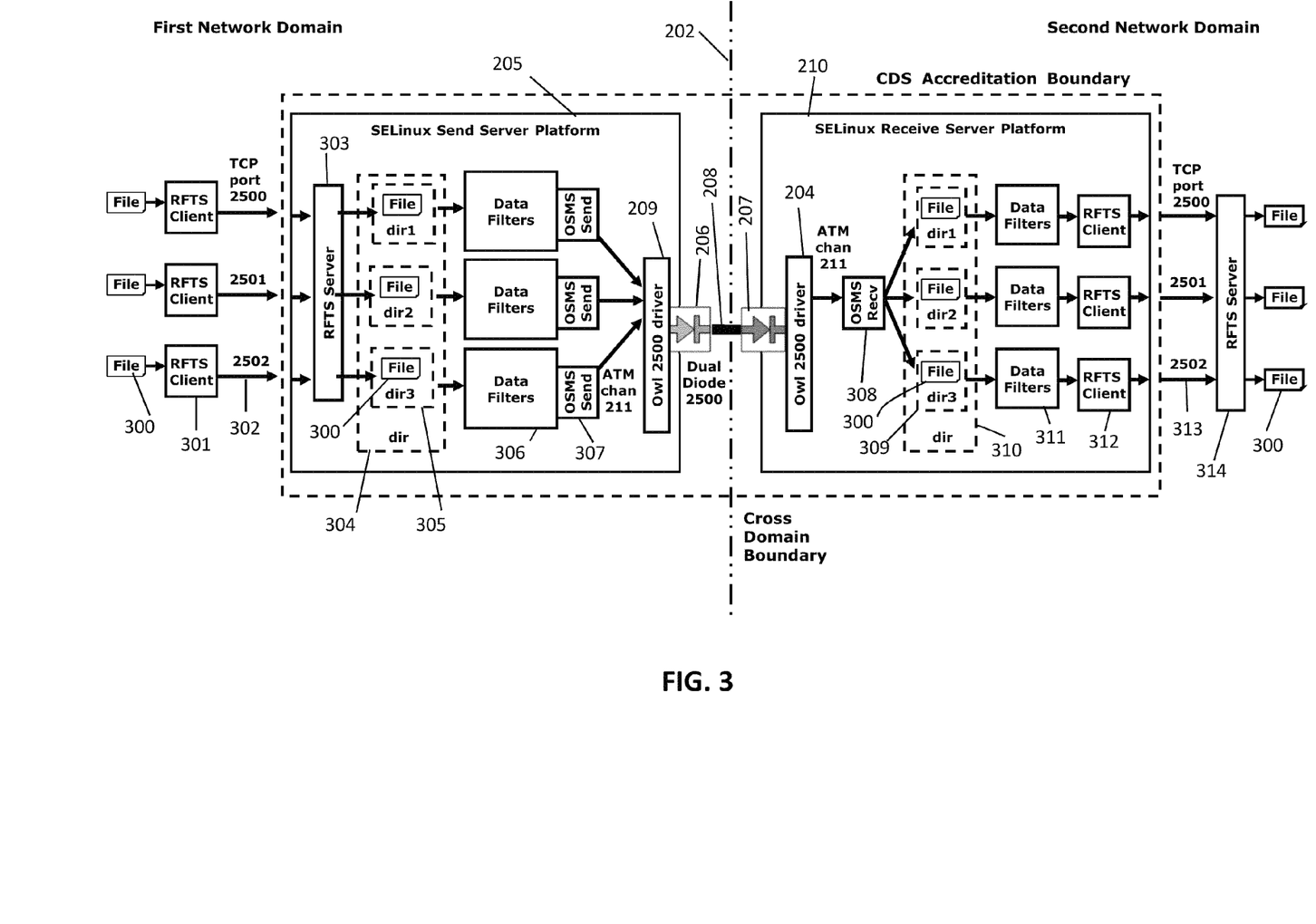
FIG. 3 is a block diagram of a portion of the one-way data transfer system shown in FIG. 2 depicting a single ATM channel.

As shown in FIG. 2, there are eight ATM (virtual) data pathways (channels) through system 200, each of which carries three separate data streams. Referring now to FIG. 3, a single ATM channel 211 is shown. The RFTS software used to transfer files to and from system 200 comprises two components: a client and a server, respectively. An RFTS client 301 is installed on each user client machine (in the first network domain) for communication of files 300 to an associated RFTS server 303. The RFTS clients (at the client computers) (one for each of the 24 channels) each creates a source-authenticated, encrypted session each time a file 300 is sent to the associated RFTS server (among the RFTS servers 225) of FIG. 2, using a single TCP socket. The same process is used for transmitting a file 300 from each of the RFTS clients 226 (e.g., RFTS client 312 in FIG. 3) to an associated RFTS server 314 installed in the destination computer (in the second network domain). Note that there will always be a separate RFTS client (e.g., client 312 in FIG. 3) for each transmission directory, but that a common RFTS server (e.g., server 314 in FIG. 3) in certain circumstances (e.g., when the destination folders are on a single destination machine) can be used to receive and store files in multiple folders. Use of RFTS software to move data to/from system 200 simplifies and hardens system 200 network interfaces. RFTS software supports primary data transfer and is not associated with any user interface or CDS administration functions. In overview, file 300 is transferred via the RFTS software and port 2502 from the client machine to a dedicated subdirectory 305 of a larger subdirectory 304 associated with ATM channel 211. When, as discussed below, a new file 300 is detected in directory 305, data filters 306 process the file to ensure that it meets the specified criteria (as discussed below). If the file 300 does not pass such checks, it is quarantined. If the file 300 passes all the imposed file checks, OSMS send module 307 transmits the file via the one-way data link and OSMS receive module 308 to dedicated subdirectory 309 of subdirectory 310 (associated with ATM channel 211 in the second server 210). When the new file 300 is detected, data filters 311 are used to ensure that file 300 meets the criteria associated with the respective filter (as discussed herein), and if so RFTS client 312 transmits file 300 via port 2502, to a destination machine in the second network domain via RFTS server 314.

The Cross Domain boundary (shown as dotted line 202 in FIGS. 2 to 5) is unambiguously located between the Send platform 205 and the Receive platform 210. More specifically, it is located at the passive optical fiber 208 that links the Send-only Owl DualDiode Communication Card 206 and the Receive-only Owl DualDiode Communication Card 207, which in operation physically enforce an unconditional one-way transfer security policy because, as in the FIG. 1 system, card 206 is incapable of receiving data and card 207 is incapable of transmitting data.

Each server platform 205, 210 is administered separately. Each server platform 205, 210 is unambiguously associated with the network to which it is connected. Administration of CDS host platforms is performed strictly in accordance with security policies defined by CDS security control requirements and any further requirements associated with the networks to which they belong.

The one-way interface in system 200 preferably features driver software 209, 204 (e.g., Owl DualDiode 2500 driver software when the OWL DualDiode Communication Cards are used for send card 206 and receive card 207) that presents multiple channel capability. For example, in the presently preferred embodiment, a single pair of OWL DualDiode 2500 communication cards operates like multiple "virtual card" pairs. Multichannel capability in the Owl DualDiode 2500 driver is achieved using ATM technology. System 200 is configured to provide eight separate virtual card channels 211 to 218 accessible by file transfer software. Each channel 211 to 218 is preferably identified using an ATM VPI/VCI channel identifier. Each channel 211 to 218 may preferably carry three data streams, for a total of 24 data streams in the presently preferred embodiment. This feature allows multiple applications to share the send card or receive card hardware as if each application were interacting with a separate card. At the driver level, each application is assigned a unique multichannel. The full bandwidth of the one-way interface, by default, is divided equally between the total number of multi-channels that are configured. Preferably, there are eight multi-channels configured in system 200. All eight channels are used to pass primary data. Thus, system 200 preferably provides for twenty-four separate file transfer data streams from first server 205 to second server 210.

The file transfer inlet TCP ports 220 are numbered in groups of three. Each group of three TCP ports is carried by a single ATM channel (one of the group of ATM channels 211 to 218). Each input data stream has its own inlet TCP port number. Outlet TCP port numbers are the same as inlet TCP port numbers for each channel. Primary data interfaces are RJ45 Ethernet at CDS inlet 220 and CDS outlet 221. Data filtering may be unique for each file transfer data stream as discussed below because, as shown in FIG. 2, each data stream has its own customer-installed custom data filter (data filters 229 and 228).

Data passes through system 200 using a two-tier channel structure. At the deeper level, OWL DualDiode technology provides eight ATM channels through which data may flow concurrently; each is accessed through a unique ATM device handle. At a higher level, three concurrent instances of the OSMS software application (OSMS send 231 and OSMS receive 232) have access to each ATM device handle, thus creating a data transfer architecture with 24 channels total.

One of the primary threats to integrity in file transmission (particularly with respect to a low-to-high system) is executable malware. System 200 is preferably equipped with data filters that permit forward data transfer based on the following criteria: (1) the file is not executable; (2) the file contains only 7-bit printable ASCII content; (3) the file is free of recognizable viruses and other malware; and (4) the file contains no "dirty words." To discern whether particular content is allowable (e.g., only non-executable 7-bit ASCII files are permitted), the system must be able to accurately identify the file/data types and deny all unless expressly permitted. System 200 verifies non-executability using the UNIX file command and ASCII format using the owllsAscii filter function. The system must be able to prevent infiltration of malicious content (virus, Trojan, executables, hidden content, etc.). All files are subject to malware scanning by multiple software applications before transfer. Malware may be checked using an antivirus scanner (e.g., the open source ClamAV antivirus scanner), and "dirty word" and base64 content checks may be performed by the customer's custom data filter.

System 200 includes design features and explicit security controls which operate together to mitigate threats to network and data security. The most significant security controls are either enforced in hardware or locked by a prevailing SELinux security policy that is not configurable by privileged user role types. Other CDS attributes are user-configurable under Role Based Access Control (RBAC). Dynamic attributes include specific user accounts for privileged users, virus definition files that must be periodically updated, and quarantine directories. System 200 was created to operate in SELinux enforced mode with fully-developed confinement policies for all of the applications required for the system to function. Security controls include: (1) one-way data transfer security policy (enforced in hardware—not configurable); (2) restricted logical access to CDS network interfaces (ports restricted by internal IP tables—not configurable); (3) source authentication and encryption for data passing through system 200 accreditation boundaries (at inlet and outlet) (not configurable); (4) network interface protocols terminate just inside system 200 accreditation boundary at CDS inlet and outlet (not configurable); (5) implementation of non-routable protocol breaks (IP to Application layer to ATM) within system 200 accreditation boundary and on both sides of the Cross Domain boundary (not configurable); (6) hardened operating system (a hardened SELinux integration platform, internal to CDS—not configurable)—a specialized suite of SELinux security policies confine all applications and run in enforced mode at all times; (7) separation of primary data interfaces from administration interfaces; (8) RBAC for privileged users enforced by login/password challenge; (9) menu-driven user interface for privileged users restricted by RBAC—Normal operation and routine maintenance are performed via menu functions and enforced by SELinux security policies at all times (not user configurable); (10) Mandatory Access Controls (MAC) for internal software applications (subjects) that manage data filtering and data transfer (of data objects). Enforced by SELinux security policies at all times—MAC also provides self-protection for the SELinux security policies themselves (not user configurable); (11) enforced principles of least privilege for user roles and automated processes—Enforced by SELinux security policies at all times (not user configurable); (12) file type and content inspection of files as they pass through system 200—Confinement of data filters enforced by SELinux security policies at all times (not user configurable); (13) software integrity verification via manual invocation by privileged users, using a choice of external CD or references internal to system 200; and (14) comprehensive internal audit logging. Mandatory Access Controls (MAC) are enforced by SELinux security policies that confine each software application used for data transfer and data filtering in its own security policy domain and control their access to system resources. Role Based Access Controls (RBAC) are enforced by ASCII text-based menu interfaces and SELinux security policies that restrict user access to system resources based on predefined user role types.

Both of the servers 205, 210 are preferably configured with a hardened operating system comprising an installation of Red Hat Enterprise Linux (RHEL), which has been further enhanced with the installation of the hardened SELinux integration platform on an SELinux framework. Operating system hardening is the process of eliminating basic vulnerabilities on the operating system by removing all non-essential tools, utilities, and other system administration options that may be usurped to facilitate a software attack. The operating system is also configured for minimal privileges necessary for automated processes and privileged users to perform their authorized functional tasks. No other software is permitted to execute. No other system resources are allowed to be accessed. Operating system parameters are not configurable once the system is installed and are thus outside the scope of CDS operation and normal maintenance.

System 200 operates in SELinux enforced mode with fully-developed, confined policies for all of the applications required for the system to function and implements the principle of least privilege whereby users and system functions only have access to information, resources, and capabilities that they need to fulfill their operational requirements, i.e., restricted access; restricted execution environment and restricted privileges. All methods of self-protection listed above are enforced in operating system software using a combination of Unix best practices in system configuration and features of the hardened operating system. Furthermore, system 200 configuration explicitly limits the available ports, protocols, and services to the minimal set required to allow system 200 to pass the defined traffic. Confinement of data transfer applications and data filters is enforced by SELinux security policies at all times, which policies are not user configurable. User interface software is confined under SELinux security policy that is enforced at all times and is not user configurable. The hardened operating system is configured to provide the minimal privileges necessary for automated processes and for privileged users to perform all intended functional tasks. No other software is permitted to execute. No other system resources are allowed to be accessed. Operating system parameters are not configurable.

System 200 presents numerous audit logging features. Audit logs ("CDS Logs") created by data transfer application software maintain a history of all data flow through system 200. Audit logs ("OS Logs") that maintain a history of all materially significant events perceived by the operating system are also created by the Linux operating system. For example, a log file entry may be written to the /var/log/sudolog directory each time a user executes a command in sudo mode. Administrators and auditors have read access to CDS logs and OS logs through system 200 user interface (shown in FIG. 4). Information Assurance Officers and Auditors are empowered to offload all logs and to clear CDS audit logs, if necessary. OS logs are archived and aged automatically by the operating system and are not cleared by system 200.

An overview of administration access to system 200 is given below. Access to the core servers is via console keyboard and monitor, using command line interfaces or menus. General access to system 200 is through source and destination computers only. Each server platform in system 200 is in one of three states: (1) off; (2) maintenance mode; and (3) operational mode. When the server platform is turned "on" it boots into the maintenance mode, in which the operating system is active but the data transfer applications are inactive. Once an authorized privileged user explicitly invokes the transition to operational mode, the data transfer applications become active.

In Operational Mode, no human intervention or supervision is required, but human interfaces may be used to examine the contents of audit logs or configuration files. Operational Mode of system 200 may be suspended (held in a secure state) for brief periods of time by transitioning to Maintenance Mode. Maintenance Mode is a state in which the core server platforms are powered up and the operating system is active, but the data transfer applications are not running Data is not capable of passing through system 200 while it is in Maintenance Mode. Routine CDS maintenance occurs under supervision of a qualified, approved human operator who is a CDS Privileged User. Examples of Maintenance Mode operations include updating antivirus signatures, setting system time, and offloading audit logs.

Personnel authorized to interact directly with system 200 for purposes of normal operation and maintenance preferably assume one of the following four privileged role types, each of whom interact with system 200 via direct console access. Security Administrator (SecA); System Administrator (SA); Audit Manager (AM); and Console Monitor (CON).

The Security Administrator (SecA) is primarily responsible for the following activities, but is capable of executing all the privileges of other user roles associated with normal operation and maintenance: (1) creates, modifies, and deletes user accounts of this and other role types; (2) configures CDS data inlet source authentication; (3) installs new custom data filters; (4) changes customer data filter parameters; (5) verifies data filter version; (6) sets and updates CDS configuration integrity verification references; (7) creates CDS configuration integrity verification CDs; (8) verifies CDS configuration integrity against internal references or using the verification CDs; and (9) manages and sets system time.

The System Administrator (SA) Role has primary responsibility for maintaining system 200 and engages in the following activities: (1) transitions to Maintenance/Operational Mode; (2) Manages antivirus data filters (e.g., ClamAV updates and updates to associated antivirus definition files); (3) Offloads/clears quarantined files; (4) Verifies system health (view audit logs, view quarantine, visual inspection of CDS).

The Audit Manager (AM) role manages all auditing functions, as required by the prevailing security policies, and is responsible for the following: (1) Offloads/clears (deletes) CDS logs; (2) offloads (archives) OS audit logs; (3) verifies system health (view audit logs, view quarantine, visual inspection of CDS).

The Console Monitor (CON) Role is one of viewing and verification. It actually performs no maintenance activity and functions only as a passive monitor of CDS health. Console Monitor tasks are performed on the console only. The Console Monitor verifies system health (view CDS audit logs, view quarantine, visual inspection of CDS).

The General User Role sends and receives files (primary data) through system 200. General Users do not interact directly with system 200 at all. Each user's account (with individual username and password) is associated with only one role type.

SELinux policies for operating in Enforcing mode require the existence of the files (including executables) at the time the lock-down policies are applied. To provide the ability to add new customer filters, system 200 contains 24 predefined placeholder subdirectories and filter names, located in a predefined subdirectory.

When a user attempts to pass data through a channel that has an Owl placeholder filter, the file will be quarantined and error messages similar to the following will be written to the log file:

Processing Filename: FILENAME
Filter Name: NEW_CUST_XX
This filter application is not a valid filter.
This filter application is a place holder to be replaced with a valid filter.

Until the Owl placeholder filters are replaced with a customer filter, no data can pass through system 200. Each Owl placeholder filter consists of predetermined number of files. The procedure to replace an Owl placeholder filter with a customer filter includes: (1) name the customer-supplied filter the same as an Owl placeholder filter; and (2) copy the renamed customer filter and overwrite the Owl placeholder filter. The customer files must be copied, overwriting the placeholder filter files, in order to retain the permissions, attributes, and ownership of the placeholder files under SELinux polices. As evident, this can only be done in Maintenance Mode. In this manner, system 200 ensures that any file added as part of a custom data filter will not be able to access any system resources which could cause disruption or interference of the proper operation of CDS system 200.

Figure 4:
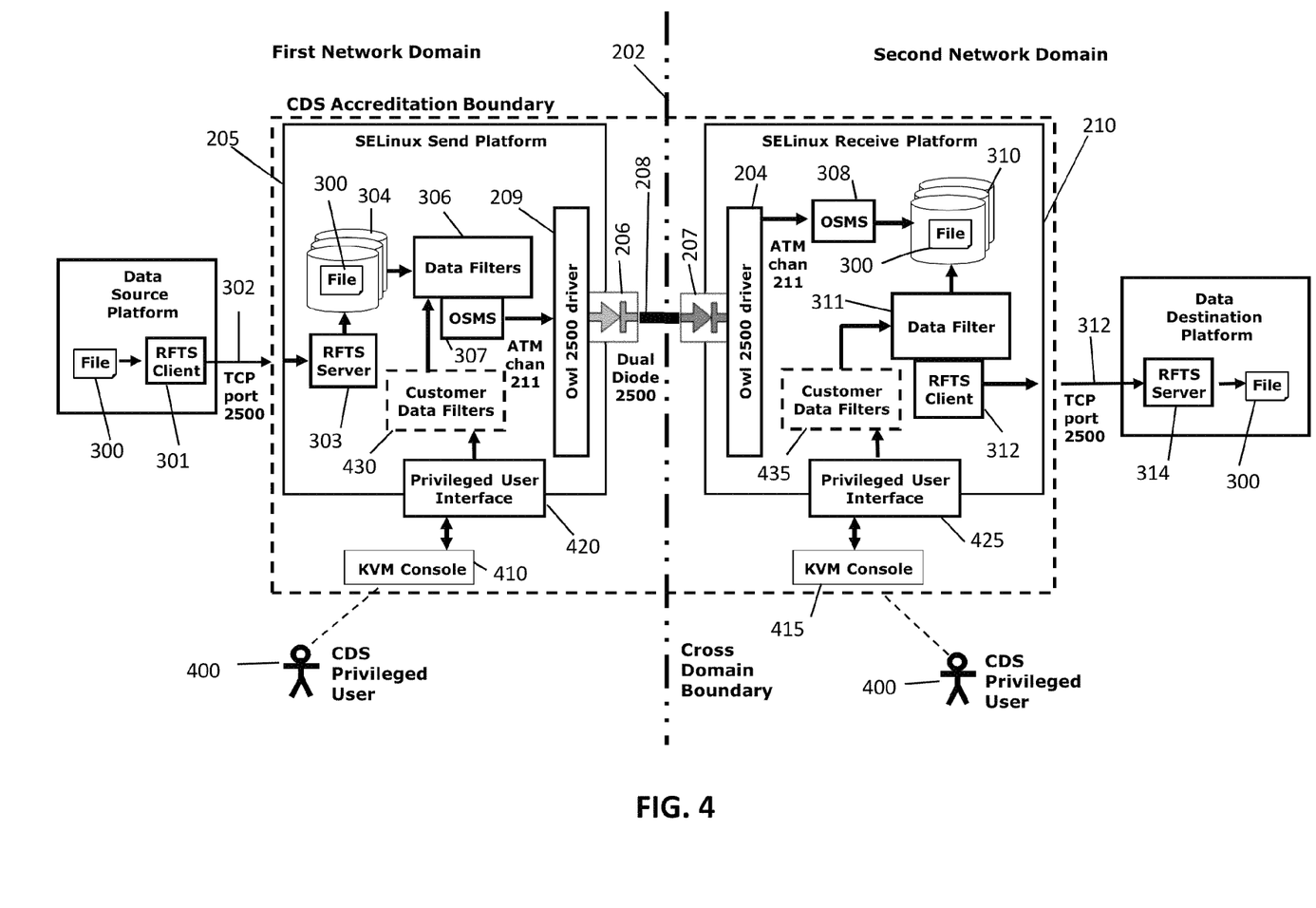
FIG. 4 is a block diagram showing a single data channel in the one-way data transfer system shown in FIG. 2 depicting the privileged user interface.

Referring now to FIG. 4, a CDS privileged user 400 may access servers 205, 210 via respective KVM consoles 410, 415 and privileged user interfaces 420, 420 in a manner consistent with the security policies discussed above. Menu options presented to the user 400 are suitable for their role type. Among the various actions discussed above that can be performed via interfaces 420, 425, a user 400 with the appropriate security level in line with the RBAC assignments, i.e., preferably the SecA, may install new custom data filters 430, 435 in accordance with the procedures discussed above.

The software installation process for each server platform is scripted and repeatable, and preferably each process executes from an installation disk. The installation process features loading of a fixed number of files with known hash signatures into known directories. Software installation begins after the hardware is installed, for reasons described below. During the software installation process, installation scripts also collect information about hardware configuration of the target platform. Hardware information includes presence/absence and type and location (if present) of Owl Dual-Diode Communication Cards, and network interface information for the hardware platform, including Media Access Control address (MAC address) for each Ethernet interface. Since installation scripts execute with root access, the software hash validation signatures and hardware characteristics of the platform are written to part of the file system inaccessible to any subsequent user, as enforced by SELinux security policies. Software validation information is also written to a pair of Verification CDs (one for the Send platform and another for the Receive platform). The two CDs contain encrypted signature files that the validation script checks against. Verification CDs may be stored apart from system 200 to provide an independent integrity reference.

Validation may be manually invoked at any time by the SecA from the administration console, using the Verification CDs. The validation script checks Owl application files, data filter application files, and SELinux binary files. For Owl application files, validation software checks the MD5 signature for all the files that are installed under /Owl. In addition, validation may be manually invoked at any time by the SecA from the administration console, using hash signatures stored internally within system 200.

CDS configurations are fixed at the time of software installation and are subject to MAC enforcement by the SELinux security policy. The security policy may not be edited or disabled by privileged users. Integrity checks are also performed at boot, periodically during operation, and before transitioning from Maintenance Mode to Operational Mode. If an integrity check fails while in Operational Mode, system 200 transitions into Maintenance Mode immediately. If an integrity check fails when transitioning from Maintenance Mode to Operational Mode, the transition does not occur. The SELinux security policy also provides strict protections on critical system resources and applications to prevent compromise of system operation or its information flows.

System 200 contains the following software component types in the first server 205 (Source Network Side): a hardened SELinux integration platform and RHEL operating system; Remote File Transfer Service (RFTS) Server Module; Post Process Module Owl ScanFile Management System (OSMS) Send Module (based on Owl Directory File Transfer System (DFTS)); File Integrity Orchestration Engine (FIOE); Problem Process Module; ClamAV software; owlIsAscii data filter; Customer-installed custom data filters.

System 200 contains the following software component types in the Second server 210 (Destination Network Side): a hardened SELinux integration platform and RHEL operating system; OSMS Receive Module (based on DFTS); Post Process Module RFTS Scan Client Module (based on RFTS Client); FIOE; Problem Process Module; Customer-installed custom data filter DFTS is designed to transfer files and populated directory structures between two host server (computer) platforms equipped with DualDiode Technology. DFTS comprises two components: Send in the first server 205 at the DualDiode inlet, and Receive located in the Receive platform 210 at the DualDiode outlet. DFTS Send is a primary data flow software module that receives data via file system access and writes data to the DualDiode device drive. DFTS is the DualDiode interface element of the OSMS application (described below). In the Figures, the Send and Receive modules are labeled "OSMS Send" and "OSMS Receive."

Figure 5:
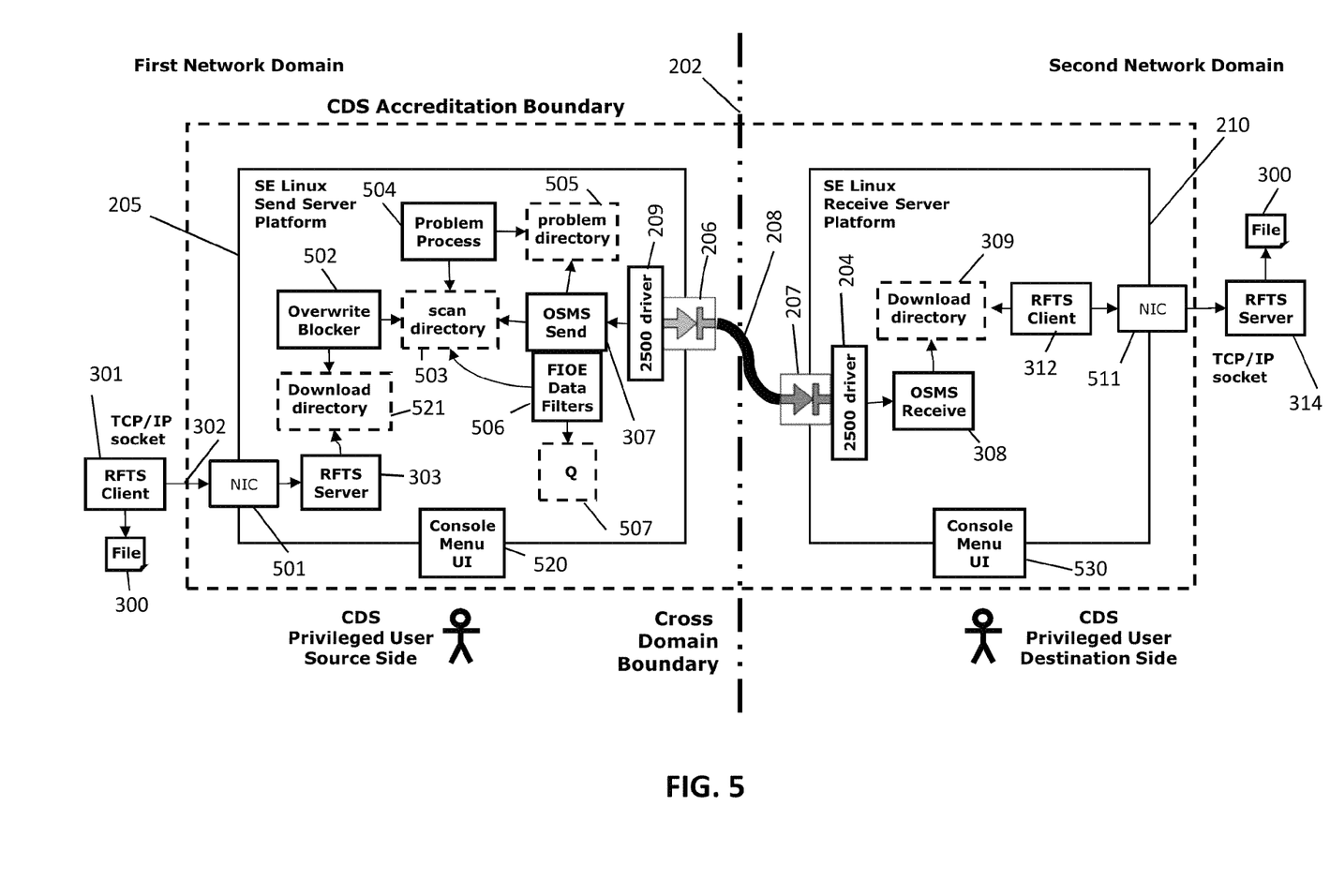
FIG. 5 is a block diagram showing the data processing performed on a file passing through a single channel in the one-way data transfer system shown in FIG. 2.

The Owl ScanFile Management System (OSMS) comprises DFTS, FIOE, data filter modules, and peripheral process modules. OSMS moves filtered data across the one-way data link. OSMS subjects all files to a suite of data filters designed to detect various security violations related to file naming, size, content, and format. If any of the tests detects a security violation, the file is quarantined. If all tests indicate that the file is free of security violations, the file is passed forward. Data filters may be deployed before or after transfer through the one-way data link (on the left- or right-side network). OSMS, as rendered in system 200, comprises four components: Post Process, an overwrite protection component; DFTS, a file transfer component; FIOE, a data filtering component.; and the Problem Process component. The OSMS architecture is shown in FIG. 5. A file 300 is received via the RFTS client 301 connection with network interface controller 501 and RFTS server 303 and placed in directory 521. Overwrite blocker 502 corresponds to the Post Process component. The Post Process component provides overwrite protection for files arriving on a particular host platform. Files 300 first arrive in a download directory 521 that is monitored by the Post Process software component. Upon detection, files 300 are moved to a separate directory (the scan directory 503) for scanning. If files 300 with the same name collide, the move is not executed, and the file remains in the download directory 521 until a file with the same name no longer exists in the scan directory 503 (then file 300 is moved to scan directory 503).

The FIOE 506 provides a modular API for integration of data filters. FIOE is invoked with a function call from another process and, in turn, invokes a predefined set of data filtering operations. Based on results of data filter operations, FIOE returns a single status/error indicator to the calling process. Instances of FIOE may be located in both the first server 205 and the Second server 210, though they are configured to call different filter applications. In the Send platform, FIOE 506 is called by (integrated with) the OSMS data transfer application 307. In the Receive platform, FIOE is called by (integrated with) RFTS Client software 312. A FIOE status return usually indicates a "go"/"no go" status. If a "go" indication is returned to the calling process, the process proceeds (i.e., the next filter is called or the file is transferred). If a "no go" indication is returned to the calling process, the file is sent to Quarantine directory 507. On occasion, data filters called by FIOE may return ambiguous scan results or crash. FIOE includes a Problem Process module 504 to manage situations where data filters do not produce a definitive "go"/"no go" status return. FIOE access to the file system and to device drivers for purposes of primary dataflow is constrained by MAC SELinux security policy.

When the FIOE calls a data filter, a sensible error return sends files to Quarantine. When presented with an ambiguous return or no return (such as a timeout or filter application crash), FIOE moves the problematic file to a problem directory 505 (out of the primary data flow path). The Problem Process module 504 is designed to monitor the problem directory 505 and periodically reintroduce the problem file to the main data flow path for re-scanning. If the problem file continues to land in the problem directory 505 over a prolonged period of time (measured in minutes), the Problem Process module 504 deletes the file and logs the event.

The RFTS Scan Client 312 comprises the RFTS Client, FIOE, data filter modules, and peripheral process modules. RFTS Scan Client is used to send filtered data from system 200 to the final destination (i.e., to the destination machine running RFTS server 314) via network interface controller 511. Although not shown in FIG. 5, the RFTS Scan Client 312 may also be configured to subject all files to a suite of data filters designed to detect various security violations related to file naming, size, content, and format. If any of the tests detects a security violation, the file is quarantined. If all tests indicate that the file is free of security violations, the file is passed forward. Data filters may be deployed before or after transfer through the RFTS session.

Figure 6:
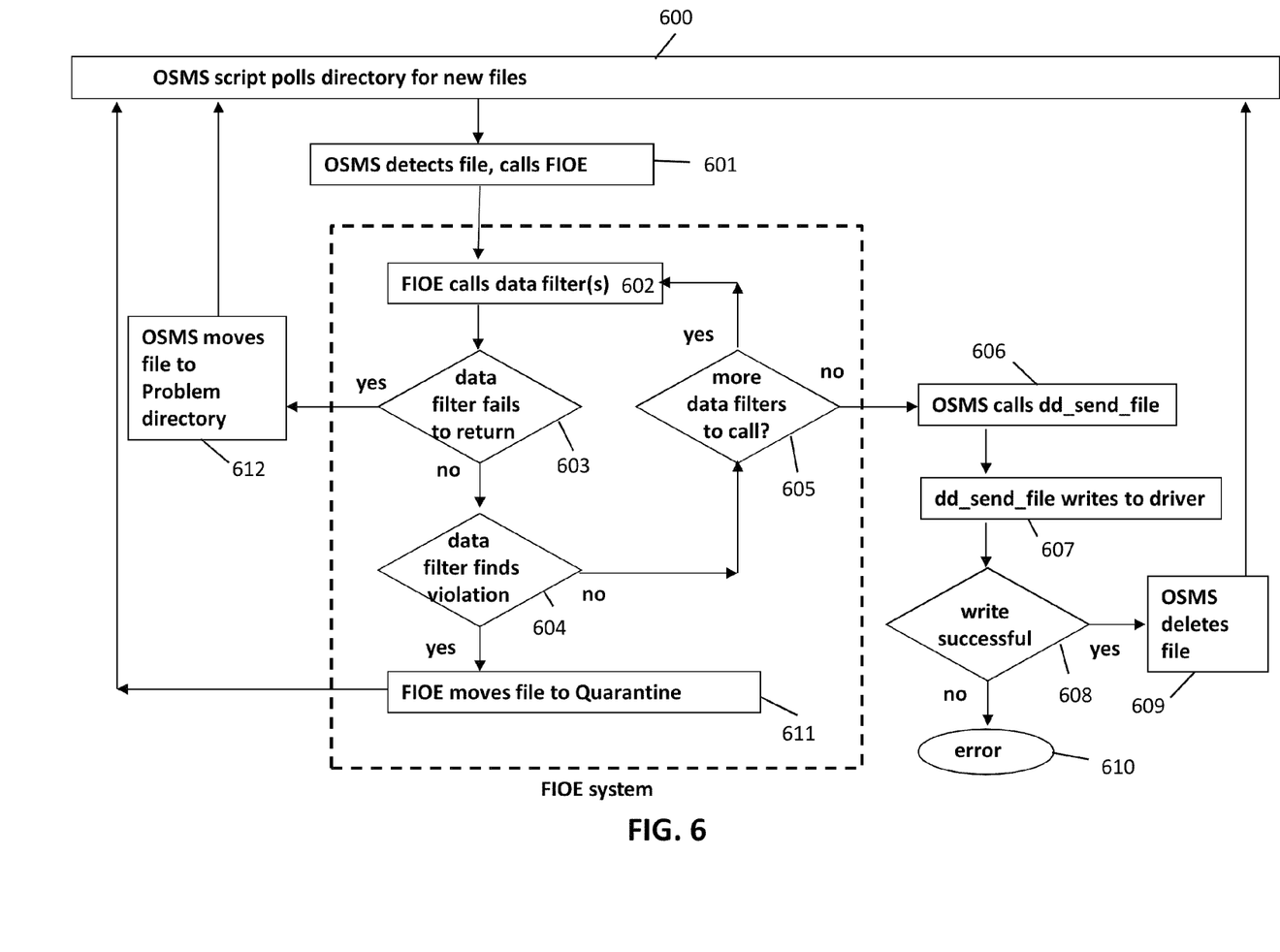
FIG. 6 is a flowchart showing the data processing performed on a file passing through a single channel in the one-way data transfer system shown in FIG. 2.

The flowchart in FIG. 6 shows the file processing in first server 205 in more detail. The OSMS send module 307 includes a script which polls the scan directory 503 for new files (step 600). Upon detection of a new file, the FIOE is called (step 601). FIOE calls the first of a series of data filters (step 602). If the data filter fails to return (step 603), the OSMS moves the file to the problem directory 505 (step 612) and processing returns to step 600. If the data filter does return at step 603, processing continues at step 604, where the results are examined. If there was a violation at step 604, the file is moved to the quarantine directory 507 at step 611 and processing returns to step 600. If there was no violation at step 604, processing moves to step 605, where it is determined if there are more data filters to call. If so, processing loops back to step 602. If all data filters are found to have been called at step 605, processing proceeds to step 606, where OSMS send 307 calls a function dd send file which, at step 607, writes the file to driver 209. If the write was found to be successful at step 608, the file is deleted (step 609) and processing returns to step 600. If the write was not successful at step 608, an error indication is given at step 610.

Figure 7:
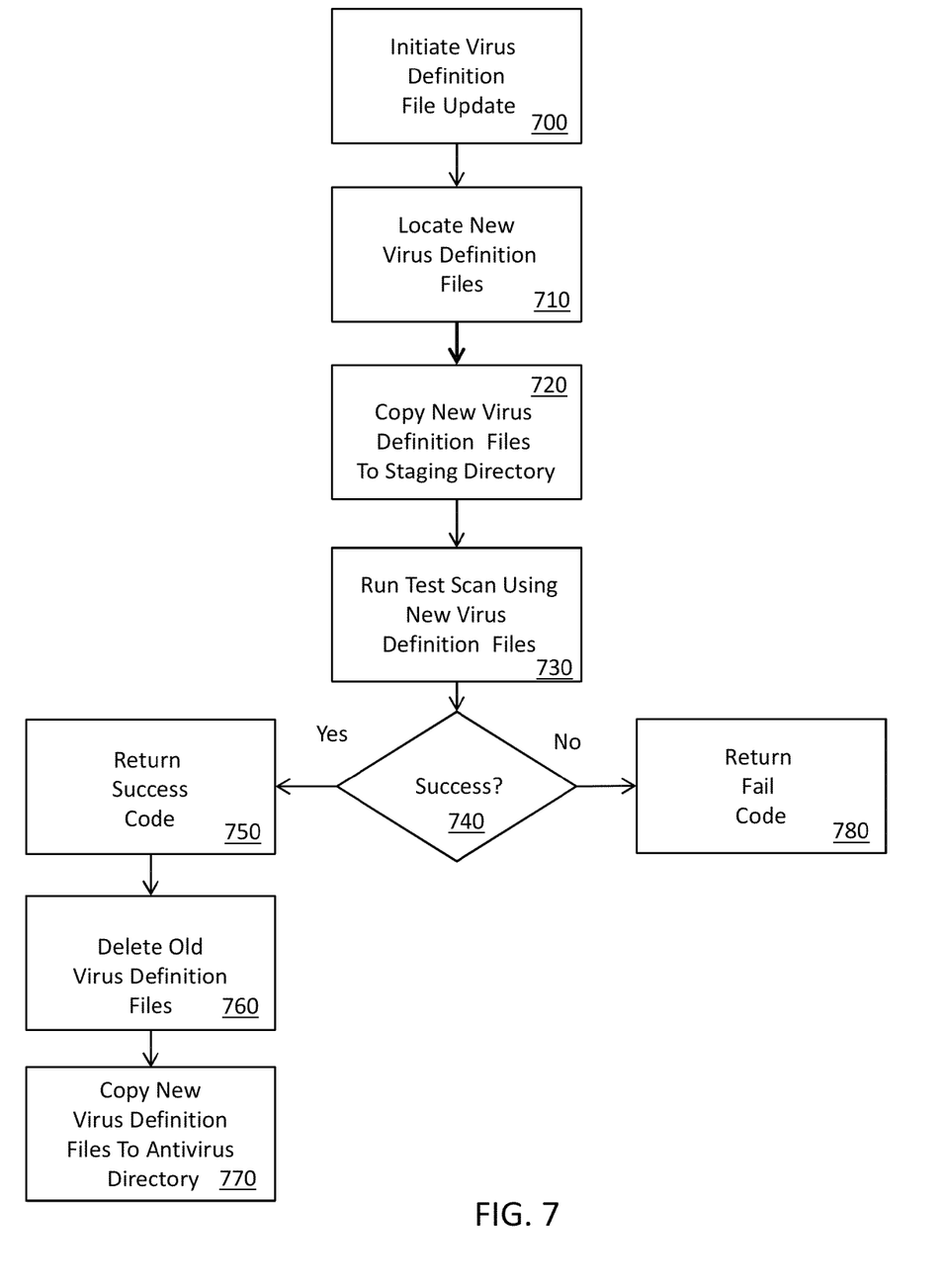
FIG. 7 is a flowchart showing how the virus definition files for the antivirus scanning software are updated and verified.

As discussed above, the System Administrator is preferably provided with the ability to manage the antivirus data filters (antivirus scanning software) and to load updates to the virus definition files. As one of ordinary skill in the art will readily recognize, other privileged roles may also be assigned this ability. This process is important because antivirus scanners require frequent updates to the virus definition files in order to keep pace with the latest identified viruses. Since virus identification is important in preventing virus infections, most antivirus scanners will not work without valid virus definition files in place. Thus, in further embodiment, a method is provided for ensuring that valid virus definition files are installed during an update. The System Administrator is preferably provided with an interface which includes a menu selection for initiating an update to the virus definition files for the ClamAV antivirus scanner (or other similar product). As one of ordinary skill in the art will readily recognize, the virus definition file update may be initiated in other conventional manners as well, e.g., using commands entered via the command line. Referring now to FIG. 7, the process for updating the virus definition files is shown in flowchart form. Upon initiation of a virus definition update (step 700), the System Administrator is provided with an interface used to identify the location of the new virus definition files (step 710). Such files are typically located on a disc inserted into a local CD/DVD drive, but such files could be located on other types of portable media (e.g., a thumb drive) or even accessed across a network (although this is not the preferred method as network access is usually limited or not available in a cross-domain solution). The new virus definition files are then copied to a temporary staging directory at step 720. Thereafter, the antivirus scanner is called to test a known good file at step 730, using the new virus definition files in the staging directory instead of the previously installed (old) virus definition files. If the virus scanner reports a successful scan at step 740, processing proceeds to step 750, where a success code is returned. Since the scan is performed on a known good file at step 730, the reporting of a successful scan at step 740 indicates that the new virus definition files are good—i.e., not corrupted or damaged in any way. Thereafter, at step 760, the old virus definition files are deleted, and at step 770, the new virus definition files are moved from the staging directory to the antivirus scanner directory. If the virus scanner does not report a successful scan (e.g., if the new virus definition file is corrupted or otherwise unusable) at step 740, processing proceeds instead to step 780, where a fail code is returned. The processing outlined in FIG. 7 ensures that the cross-domain solution will always include operable antivirus scanning software and prevent any downtime caused by corrupted (or otherwise unusable) virus definition files.

Although the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A cross-domain system for transferring files from a client coupled to a first network in a first network domain to a server coupled to a second network in a second network domain, the cross-domain system comprising:

a first server in the first network domain having an input adapted to receive files from the client via the first network and store the received files in a first temporary memory, the first server configured to process the received files based on predetermined instructions stored in at least one associated first file stored in a first permanent memory, the first server also having an output for transmitting the processed received files;

a one-way data link having an input coupled to the output of the first server and an output; and a second server in the second network domain having an input adapted to receive the processed received files from the first server via the one-way data link and store the received files in a second temporary memory, the second server configured to further process the received files based on predetermined instructions stored in at least one associated second file stored in a second permanent memory, the second server also having an output adapted to transmit the further processed received files to the server via the second network;

wherein the first server is configured to store the at least one associated first file in the first permanent memory with first security policies which prevent the at least one associated first file from disrupting operation of the first server;

wherein the second server is configured to store the at least one associated second file in the second permanent memory with second security policies which prevent the at least one associated second file from disrupting operation of the second server;

wherein the first and second servers are configured to allow the at least one associated first file and the at least one associated second file to be overwritten to update the processing performed by the first server and the second server, respectively, while maintaining the respective security policies applied to such files.

2. The system of claim 1, wherein the first permanent memory and the second permanent memory each constitute a hard disk.

3. The system of claim 1, wherein the processing performed by the first server constitutes filtering.

4. The system of claim 3, wherein the at least one associated first file contains instructions which cause all files to be blocked from being transmitted on the output of the first server.

5. The system of claim 3, wherein the at least one associated first file contains instructions for filtering the received file based on predetermined criteria specified by a customer.

6. The system of claim 1, wherein the processing performed by the second server constitutes filtering.

7. The system of claim 6, wherein the at least one associated second file contains instructions which cause all files to be blocked from being transmitted on the output of the second server.

8. The system of claim 6, wherein the at least one associated second file contains instructions for filtering the received file based on predetermined criteria specified by a customer.

9. A cross-domain system for transferring files from a client coupled to a first network in a first network domain to a server coupled to a second network in a second network domain, the cross-domain system comprising:

a first server in the first network domain having an input adapted to receive files from the client via the first network and store the received files in a first temporary memory, the first server configured to process the received files based on predetermined instructions stored in at least one associated first file stored in a first permanent memory, the first server also having an output for transmitting the processed received files;

a one-way data link having an input coupled to the output of the first server and an output; and a second server in the second network domain having an input adapted to receive the processed received files from the first server via the one-way data link and store the received files in a second temporary memory, the second server also having an output adapted to transmit the received files to the server via the second network;

wherein the first server is configured to store the at least one associated first file in the first permanent memory with security policies which prevent the at least one associated first file from disrupting operation of the first server;

wherein the first server is configured to allow the at least one associated first file to be overwritten to update the processing performed by the first server, while maintaining the security policies applied to such file.

10. The system of claim 9, wherein the first permanent memory and the second permanent memory each constitute a hard disk.

11. The system of claim 9, wherein the processing performed by the first server constitutes filtering.

12. The system of claim 11, wherein the at least one associated first file contains instructions which cause all files to be blocked from being transmitted on the output of the first server.

13. The system of claim 11, wherein the at least one associated first file contains instructions for filtering the received file based on predetermined criteria specified by a customer.

14. A cross-domain system for transferring files from a client coupled to a first network in a first network domain to a server coupled to a second network in a second network domain, the cross-domain system comprising:

a first server in the first network domain having an input adapted to receive files from the client via the first network and store the received files in a first temporary memory, the first server also having an output for transmitting the received files;

a one-way data link having an input coupled to the output of the first server and an output; and a second server in the second network domain having an input adapted to receive the received files from the first server via the one-way data link and store the received files in a second temporary memory, the second server configured to process the received files based on predetermined instructions stored in at least one associated second file stored in a second permanent memory, the second server also having an output adapted to transmit the processed received files to the server via the second network;

wherein the second server is configured to store the at least one associated second file in the second permanent memory with security policies which prevent the at least one associated second file from disrupting operation of the second server;

wherein the second server is configured to allow the at least one associated second file to be overwritten to update the processing performed by the second server, while maintaining the security policies applied to such file.

15. The system of claim 14 wherein the first permanent memory and the second permanent memory each constitute a hard disk.

16. The system of claim 14, wherein the processing performed by the second server constitutes filtering.

17. The system of claim 16, wherein the at least one associated second file contains instructions which cause all files to be blocked from being transmitted on the output of the second server.

18. The system of claim 16, wherein the at least one associated second file contains instructions for filtering the received file based on predetermined criteria specified by a customer.

* * * * *